United States Patent [19]

Nomura et al.

[11] 4,250,403

[45] Feb. 10, 1981

[54] ELECTRONIC TRIP METER WITH A CORRECTION CIRCUIT FOR AN AUTOMOTIVE VEHICLE

[75] Inventors: Hiroyuki Nomura; Takaaki Mogi, both of Yokohama; Masanori Mizote, Yokosuka; Kiyoshi Yamaki, Yokohama; Takashi Oka, Tokyo; Hideoki Matsuoka, Yokohama, all of Japan

[73] Assignee: Nissan Motor Company, Limited, Yokohama, Japan

[21] Appl. No.: 968,981

[22] Filed: Dec. 13, 1978

[30] Foreign Application Priority Data

Dec. 23, 1977 [JP] Japan .................. 52-156054

[51] Int. Cl.³ ............... G06F 15/20; G06M 3/14
[52] U.S. Cl. .................. 235/92 DN; 235/92 PL; 235/92 PE; 235/92 EV; 364/424

[58] Field of Search ........ 235/92 DN, 92 EV, 92 PE, 235/92 PL, 92 DM, 95 R, 97; 364/424, 460, 561

[56] References Cited

U.S. PATENT DOCUMENTS

| | | | |
|---|---|---|---|
| 3,705,295 | 12/1972 | Betz | 235/92 PL |
| 3,845,281 | 10/1974 | Konisi et al. | 235/92 PL |
| 3,947,664 | 3/1976 | Cox et al. | 235/92 DN |
| 4,145,605 | 3/1979 | Marcus | 235/92 PL |

*Primary Examiner*—Joseph M. Thesz

[57] ABSTRACT

An electronic trip meter with a correction circuit for an automotive vehicle comprises a counter for producing an ouput signal indicative of a measured distance, an error detector for deriving an error factor of the measured distance with respect to a reference distance, a correction circuit for correcting the measured distance by the error factor, and a display circuit for displaying the corrected distance.

12 Claims, 4 Drawing Figures

ELECTRONIC TRIP METER WITH A CORRECTION CIRCUIT FOR AN AUTOMOTIVE VEHICLE

FIELD OF THE INVENTION

The present invention generally relates to a trip meter for an automotive vehicle. More specifically, the present invention relates to an electronic trip meter which include circuitry for correcting a measured distance when the distance measured by a conventional trip meter is erroneous.

BACKGROUND OF THE INVENTION

Generally conventional type of trip meters are of the mechanical type. In such trip meters a mechanical counter including a numeral display device is driven via reduction gears by a drive shaft operatively connected to the transmission or other mechanism of the vehicle. A predetermined number of the rotations of the drive shaft corresponds to a predetermined unit distance so that the numerals indicative of the distance travelled by the vehicle increases in proportion to the number of the rotations of the drive shaft.

However, the distance derived from the conventional trip meter is apt to be erroneous since the substantial diameter of wheels of the vehicle is apt to vary in accordance with various conditions of the vehicle, such as the air pressure of each wheels and the weight of the load of the vehicle which is very much influenced by the number of passengers. Moreover, when wheels of the vehicle used for a relatively long period of time, the diameter of each of the wheels becomes smaller due to wear of the outer surface thereof. When the substantial diameter of each of wheels is different from a predetermined value, a predetermined number of rotations of the wheels which should correspond to a predetermined number of rotations of the drive shaft does not correctly correspond to a predetermined unit distance.

Therefore, in order to ascertain an accurate distance actually travelled, the vehicle driver had to modify the measured distance by an error factor. For obtaining the error factor the vehicle driver is supposed to measure the distance of a predetermined course the distance of which is already known, by the trip meter of the vehicle. Unless the error is zero, the vehicle driver has to divide the predetermined distance of the course by the measured distance to obtain the error factor and to multiply the error factor to the measured distance to correct the erroneously measured distance. The above mentioned calculations, i.e. the devision and multiplication are usually troublesome and then the vehicle driver had to put up with the erroneous distances.

SUMMARY OF THE INVENTION

The present invention has been developed in order to remove the above mentioned drawback of the conventional trip meter.

According to the present invention, the error included in the measured distance with respect to a reference distance is obtained by an electronic circuit in the form of an error factor and then the error factor is utilized in another electronic circuit to modify (correct) the measured distance so as to ascertain the correct distance automatically.

It is therefore, an object of the present invention to provide an electronic trip meter in which a measured distance is automatically corrected and the corrected distance is displayed.

BRIEF DESCRIPTION OF THE DRAWINGS

This and other objects and features of the present invention will become more readily apparent from the following detailed description of the preferred embodiment taken in conjunction with the accompanying drawings in which.

DETAILED DESCRIPTION OF THE PREFERRED EMBODIMENT

Figure 1:
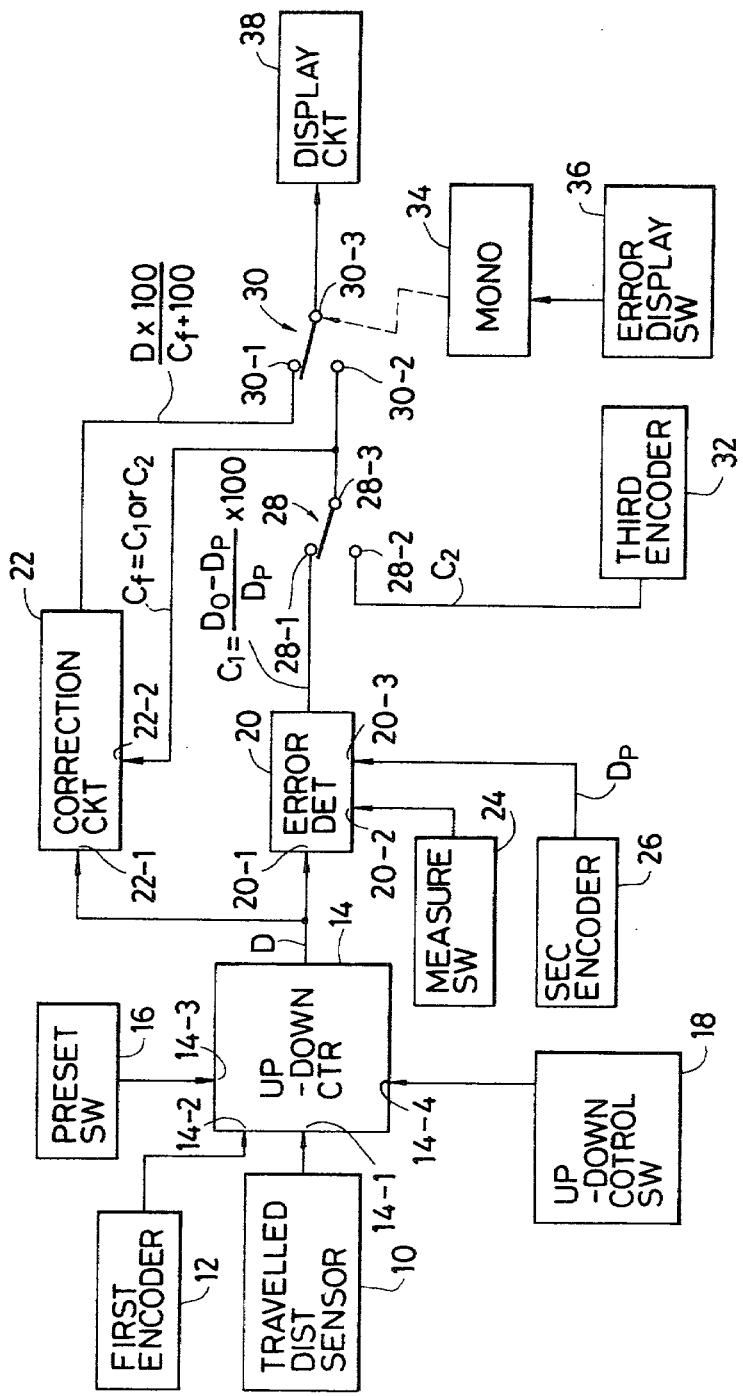
FIG. 1 shows in block diagram form a preferred embodiment of the trip meter according to the present invention.

FIG. 1 illustrates in schematic block diagram form a preferred embodiment of the trip meter according to the present invention. The circuit arrangement of the trip meter includes a travelled distance sensing circuit 10, a first encoder 12, a presettable up-down counter 14, a preset switch 16, an up-down control switch 18, an error detecter 20, a correction circuit 22, a measure switch 24, a second encoder 26, an auto-manual selection switch 28, error-distance selection switch 30, a third encoder 32, a monostable multivibrator 34, an error display switch 36, and a display circuit 38.

The travelled distance sensing circuit 10 includes a pulse signal generator (not shown) which generates a pulse each time the vehicle travels a predetermined unit distance. The pulse signal generator may be operatively connected to a driveshaft of the transmission (not shown) or the odometer (not shown) of the vehicle. If necessary, a suitable waveform shaping circuit such as a schmitt trigger circuit may be provided to shape the pulses produced by the pulse signal generator. The output of the travelled distance sensing circuit 10 is connected to an input 14-1 of the up-down counter 14.

The encoder 12 consists of a keyboard (not shown in FIG. 1 but in FIG. 4) and a conventional decimal-binary converter such as a BCD (binary-coded decimal) circuit (not shown). The output of the encoder 12 is connected to a second 14-2 input of the up-down counter 14. The preset switch 16 is of a manual type and is arranged to produce a pulse signal of a logic level when operated. The output of the preset switch 16 is connected to a preset terminal 14-3 of the up-down counter 14. The up-down control switch 18 is also a manual type switch and is arranged to produce a pulse signal of a logic level when operated. The output of the up-down control switch 18 is connected to an up-down control terminal 14-4 of the up-down counter 14.

The up-down counter 14 is arranged to produce an output signal indicative of a distance D, i.e. a travelled distance or a remaining distance, by counting up or counting down the number of pulses applied to the first input 14-1 thereof from the travelled distance sensor 10. The preset switch 16 and the encoder 12 are used for presetting a distance, such as the distance between two points to be travelled, into the up-down counter 14. In order to preset a distance into the up-down counter 14, the vehicle driver is supposed to operate the keyboard of the encoder 12 and to operate the preset switch 16. The up-down control switch 18 is used for controlling the up count function and the down count function of the up-down counter 14. When the up-down counter 14 is in the up count function, the up-down counter 14 produces an output signal by counting up the number of pulses applied from the travelled distance sensor 10 so that the distance D indicated by the output signal of the up-down counter 14 equals the sum of the distance indicated by the number of pulses from the travelled distance sensor 10 and the preset distance. In the opposite manner, when the up-down counter 14 is in the down counting function, the output signal of the same is obtained by subtracting the distance indicated by the number of pulses included in the output signal of the travelled distance sensor 10 from the preset distance, for indicating a distance D remaining to an objective point.

Figure 2:
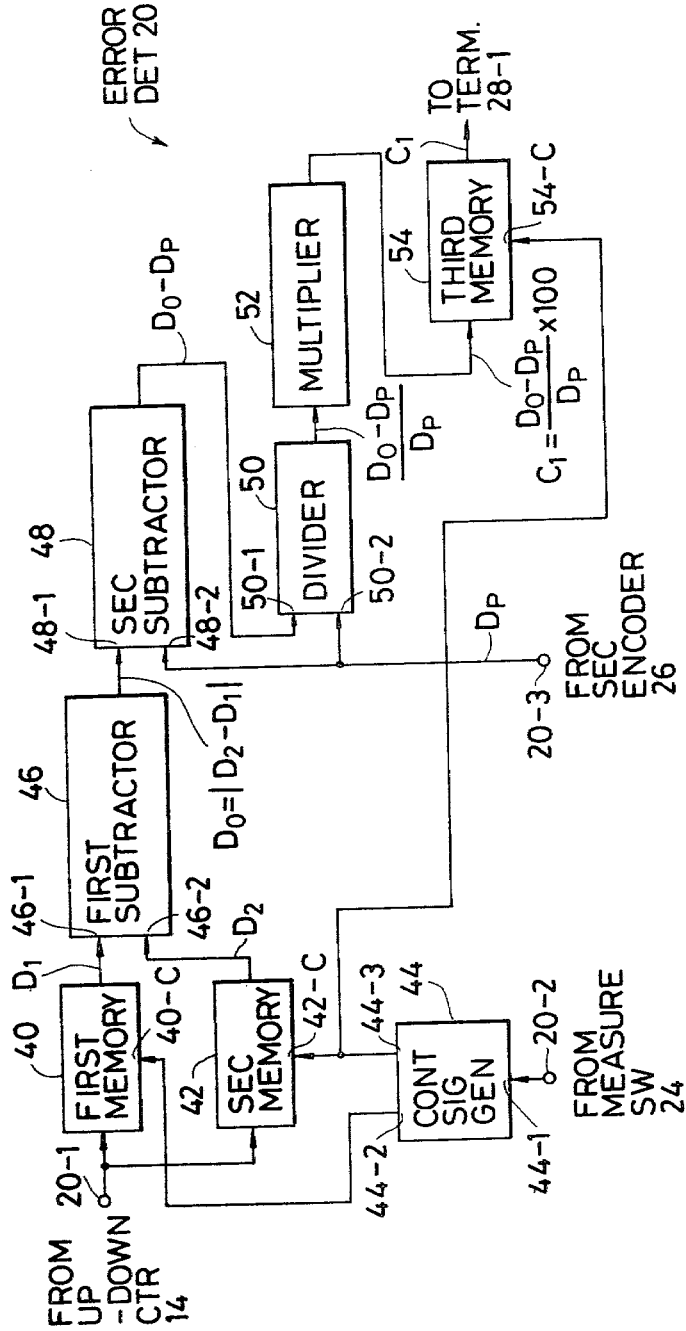
FIG. 2 shows in block diagram form a detailed circuit of the error detector shown in FIG. 1.
Figure 3:
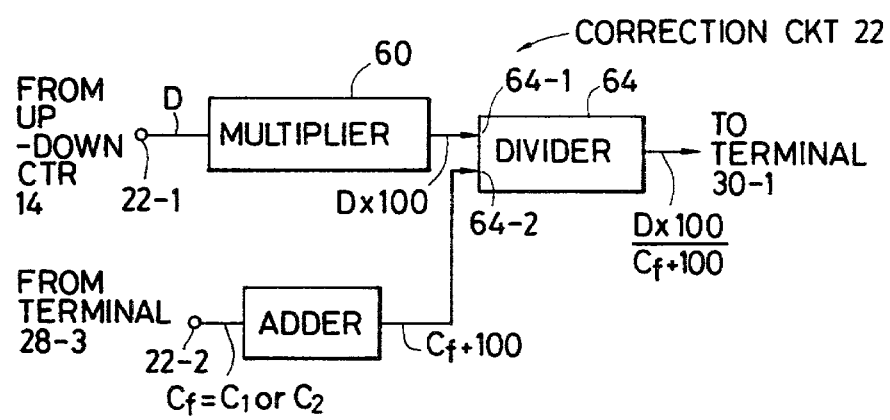
FIG. 3 shows in block diagram form a detailed circuit of the correction circuit shown in FIG. 1.

The output of the up-down counter 14 is connected to a first input 20-1 of the error detector 20, the detailed circuit of which is shown in FIG. 2, and to a first input 22-1 of the correction circuit 22, the detailed circuit of which is shown in FIG. 3. The measure switch 24 is of a manual type and is arranged to produce a pulse signal of a logic level, with which the error detector 20 is controlled, when operated. The output of the measure switch 24 is connected to a control terminal 20-2 of the error detector 20. The second encoder 26 may have the same construction as the first encoder 12. The second encoder 26 is arranged to produce a signal indicative of a predetermined distance which is to be preset as a reference distance in the error detector 20.

The output of the error detector 20 is connected to a terminal 28-1 of the auto-manual selection switch which is generally indicated by 28. The auto-manual selection switch 28 is of a double-pole type and has a second terminal in addition to the first terminal, and a movable contact connected to a third terminal 28-3. The second terminal 28-2 of the auto-manual selection switch 28 is connected to an output of the third encoder 32 the arrangement of which is substantially the same as the first and second encoders 12 and 26. The third encoder 32 is utilized to manually set an error factor. If desired, a single encoder may be used as the above mentioned first, second and third encoders 12, 26 and 32 where the output of the encoder is selectively supplied to the corresponding circuit via a suitable selection circuit (not shown).

The third terminal 28-3 of the auto-manual selection switch 28 is connected to a second input 22-2 of the correction circuit 22 and to a second terminal 30-2 of the error-distance selection switch 30. The output of the correction circuit 22 is connected to a first terminal 30-1 of the error-distance selection switch 30. The error-distance selection switch 30 has a movable contact connected to a third terminal 30-3. The movable contact of the error-distance selection switch 30 is arranged to contact with the first and second terminals respectively in response to a signal applied from the monostable multivibrator 34. In other words, the error-distance selection switch 30 may be a relay or a gate circuit which functions as a double-pole switch in response to a control signal. The monostable multivibrator 34 is used as a timer circuit and is arranged to produce a pulse signal, the pulse width of which is predetermined and constant, in response to a trigger signal applied to an input thereof from the error-display switch 36. The error-display switch 36 may be a push-button type switch which is arranged to produce a triggering pulse when operated.

The third terminal 30-3 of the error-distance selection switch 30 is connected to an input of the display circuit 38 which displays numerals in accordance with the information applied thereto.

Referring now to FIG. 2 and FIG. 3 which respectively show the detailed circuit diagram of the error detector 20 and the correction circuit 22, the error detector 20 consists of first, second and third memories 40, 42 and 54, a control signal generator 44, first and second subtractors 46 and 48, a divider 50, and a multiplier 52, while the correction circuit 22 consists of a multiplier 60, an adder 62 and a divider 64.

As shown in FIG. 2, the first input 20-1 of the error detector 20 is connected to each input of the first and second memories 40 and 42. The control terminal 20-2 of the error detector 20 is connected to an input 44-1 of the control signal generator 44. The control signal generator 44 has two output terminals 44-2 and 44-3 at which control signals are respectively obtained in response to the input signal thereof. The first output 44-2 of the control signal generator 44 is connected to a control terminal 40-c of the first memory 40, while the second output 44-3 of the same is connected to control terminals 42-c and 54-c of the second and third memories 42 and 54. The outputs of the second and third memories 40 and 42 are respectively connected to first and second inputs 46-1 and 46-2 of the first subtractor 46 the output of which is connected to a first input 48-1 of the second subtractor 48. The second input terminal 20-3 of the error detector 20 is connected to a second input 48-2 of the second subtractor 48 and to a second input 50-2 of the divider 50. The output of the second subtractor 48 is connected to a first input 50-1 of the divider 50 the output of which is connected to an input of the multiplier 52. The multiplier 52 is arranged to multiply an amount indicated by the input signal by 100. The output of the multiplier 52 is connected to an input of the third memory 54 the output of which is connected to the first terminal 28-1 of the auto-manual selection switch 28.

The function and operation of the trip meter will be described hereinafter in connection with FIGS. 1, 2 and 3. As previously described, the up-down counter 14 functions as either an up counter or a down counter for respectively producing an output signal indicative of a distance D actually travelled by the vehicle or remaining to an objective point of a predetermined course. It is assumed at first that the up-down counter 14 functions as an up-counter to produce an output signal indicative of a distance D travelled by the vehicle. The up-down counter 14 counts the number of pulses applied from the travelled distance sensor 10 to produce the output signal. Therefore, the distance D indicated by the output signal of the up-down counter 14 increases as the vehicle keeps travelling. This output signal of the up-down counter 14 is fed to the error detector 20 and to the correction circuit 22.

In order to detect the error of the distance D indicated by the output signal of the up-down counter 14, the error detector 20 functions as follows. The vehicle driver is supposed to travel along a predetermined course the length or distance of which is previously ascertained by the vehicle driver. As such a predetermined course, distance markers such as provided along highways for indicating a remaining distance to a guide point or an objective point may be used. Since the distance, such as 100 m, of the course is known by the vehicle driver, he is supposed to preset the distance into the second subtractor 48 and to the divider 50 of the error detector 20 as a reference distance $D_p$ by means of the second encoder 26. Assuming that the distance of the predetermined course is 100 m, a numeral 100 is encoded by the second encoder 26 and then is preset in the second subtractor 48 and the divider 50.

The first, second and third memories 40, 42 and 54 are arranged to store information applied to the input thereof in response to a control signal fed to the control terminals 40-c, 42-c and 54-c. When a single pulse is fed to the control signal generator 44 from the measure switch 24, the control signal generator produces a first control signal which in turn is supplied to the first memory 40. The control signal generator 44 produces a second control signal which in turn is applied to the second and third memories when a second pulse is applied from the measure switch 24. With this arrangement, the first and second memories 40 and 42 are respectively arranged to store signals each of which is indicative of a distance travelled when the measure switch 24 is operated. The measure switch 24 is supposed to be operated once when the vehicle is at the starting point of the predetermined course and is further supposed to be operated again at the end point of the predetermined course. With this operation, the first and second memories 40 and 42 respectively store distances $D_1$ and $D_2$ travelled as far as the starting point and the end point.

The outputs of the first and second memories 40 and 42 are respectively fed to first and second inputs of the first subtractor 46. The first subtractor 46 thus produces an output signal indicative of the difference between two distances $D_1$ and $D_2$ indicated by the output signals of the first and second memories 40 and 42 by subtracting the first distance $D_1$ from the second distance $D_2$. When the result of the subtraction is of a negative value, the result is converted into a positive value within the first subtractor 46. This means that the difference between the two distances $D_1$ and $D_2$ is obtained in the form of an absolute value, which is expressed in terms of $|D_2 - D_1|$. The output signal of the first subtractor 46 indicative of the difference $|D_2 - D_1|$ in distance, which is indicated by $D_0$ is fed to the first input 48-1 of the second subtractor 48. Since the second subtractor 48 is preset with the predetermined reference distance $D_p$, the second subtractor 48 produces an output signal indicative of the difference between two distances $D_0$ and $D_p$. The difference indicated by the output signal of the second subtractor 48 is indicated by $D_0 - D_p$ as shown. This signal is fed to the first input of the divider 50 so that the divider 50 produces an output signal indicative of a factor expressed in terms of $(D_0 - D_p)/D_p$. This signal is fed to the multiplier 52 and is multiplied by 100 so that an output signal indicative of a factor, i.e. the product, expressed by $(D_0 - D_p)/D_p \times 100$ is obtained. This signal is fed to the third memory 54 and is stored in the third memory 54 when the second control signal is fed to the control terminal 54-c thereof.

From the foregoing, it will be seen that the first and second memories 40 and 42 and the first subtractor 46 are used for deriving a signal indicative of a distance, measured by the up-down counter 14, of the predetermined course. It is to be noted that the output signal of the first subtractor 46 does not necessarily correspond with the preset distance $D_p$ since the output signal of the up-down counter 14 may be erroneous.

Since the second subtractor 48 produces an output signal indicative of the difference between two distances $D_0$ and $D_p$, if the two distances $D_0$ and $D_p$ are exactly the same, the result of the subtraction is zero. In such a case, of course, the output signals of the following stages, i.e. the divider 50, the multiplier 52, and the third memory 54 are indicative of zero. The output signal of the divider 50 indicates an error factor of the measured distance $D_0$ with respect to the predetermined reference distance $D_p$. Assuming the reference distance $D_p$ is 100 m and the measured distance $D_0$ is 105 m, the error factor is 0.05. The error factor is multiplied by 100 via the multiplifer 52 so that the error factor of 0.05 is converted into 5. This numeral obtained by the multiplier 52 is fed via the third memory 54 to the display circuit 38 shown in FIG. 1 so as to indicate that the measured distance $D_0$ includes 5 percent error with respect to the predetermined reference distance $D_p$ by displaying the numeral of 5 when the output signal of the error detector 20 is passed through the two switches 28 and 30. This error expressed in the form of percentage is denoted by $C_1$. The output signal of the error detector 20 is further supplied via the auto-manual selection switch 28 to the correction circuit 22. It will be understood that the output signal, indicative of the error $C_1$ of the error detector 20 is used in the correction circuit 22 as a correction factor $C_f$ to correct the distance measured by the up-down counter 14.

Reference is now made to FIG. 3 which shows in block diagram form the detailed circuit of the correction circuit 22 shown in FIG. 1, which consists of a multiplier 60, an adder 62 and a divider 64. The first input 22-1 of the correction circuit 22 is connected to an input of the multiplier 60 the output of which is connected to a first input 64-1 of the divider 64. The second input 22-2 of the correction circuit 22 is connected to an input of the adder 62 the output of which is connected to a second input 64-2 of the divider 64. The output of the divider 64, i.e. the output of the correction circuit 22 is connected to the first terminal 30-1 of the error-distance selection switch 30.

The multiplier 60 is arranged to multiply the distance D indicated by the output signal of the up-down counter 14 by 100 for producing a product thereof, while the adder 62 is arranged to add 100 to the correction factor $C_f$, i.e. one of the error factors $C_1$ and $C_2$ for producing a sum thereof. In accordance with the position of the movable contact of the auto-manual selection switch 28, the adder 62 is arranged to receive one of the error factors $C_1$ and $C_2$ respectively produced in the error detector 20 and the third encoder 32. The function and usage of the third encoder 32 will be described hereinlater.

It is now assumed that the output signal of the error detector 20 indicative of the error factor $C_1$ which is expressed in the form of percentage is fed to the adder 62 as the correction factor $C_f$. The factors respectively indicated by the output signals of the multiplier 60 and the adder 62 are expressed in terms of $D \times 100$ and $C_f + 100$ respectively. These two factors are respectively fed to the divider 64 so that the divider 64 produces an output signal indicative of a distance which is expressed in terms of $(D \times 100)/(C_f + 100)$, by dividing the product by the sum.

As an example, it is supposed that the error factor $C_1$ which is used as the correction factor $C_f$ is 5 percent. If the distance D measured by the up-down counter 14 is 10.5 Km, the accurate distance which is to be derived is 10.0 Km. By substituting 10.5 Km and 5 percent into D and $C_f$ respectively of the above shown fromula, we will obtain 10.0 Km which exactly corresponds with the accurate distance. From the formula, it will be seen that the output signal of the divider 64, i.e. the output signal of the correction circuit 22 indicates a correct distance actually travelled by the vehicle.

The output signal of the correction circuit 22 is fed via the error-distance selection switch 30 to the display circuit 39 when the movable contact of the switch 30 is in contact with the first terminal 30-1. The movable contact of the error-distance selection switch 30 is arranged to normally contact with the first terminal 30-1 and to contact with the second terminal 30-2 for a predetermined period of time defined by the pulse width of the output signal of the monostable multivibrator 34. The pulse width of the output signal of the monostable multivibrator 34 is selected to correspond with a few seconds so that the signal at the third terminal 28-3 of the auto-manual selection switch 28 is fed to the display circuit 38 for the predetermined period of time. Although in the preferred embodiment shown in FIG. 1, the error-distance selection switch 30 is arranged to be controlled by the output signal of the monostable multivibrator, the error-distance selection switch 30 may be a manual switch if desired.

In the above described operation, the distance measured by the up-down counter 14 is corrected by the correction factor $C_f$ automatically. However, in case that the vehicle driver is aware of an error factor $C_2$, i.e. the correction factor $C_f$, without measuring a predetermined distance by the trip meter, the correction factor $C_f$ may be set manually. For instance, when the wheels of the vehicle are changed, the difference in diameter between the old (used) wheels and new wheels is easily obtained. From this difference the vehicle driver may readily ascertain the error factor $C_2$ of the distance which will be measured by the up-down counter. Suppose the error factor $C_2$ is 3 percent, the error factor is encoded by the third encoder 32 and is fed to the correction circuit 22 as the correction factor $C_f$ via the auto-manual selection switch 28. In this case the correction circuit 22 produces an output signal in the same manner as in the previously mentioned automatic correction of the measured distance.

In the second subtractor 48 included in the error detector 20, the result of the subtraction is obtained by subtracting the preset distance $D_p$ from the measured distance $D_0$ along the predetermined course as described hereinbefore. Therefore, when the measured distance is larger than the preset distance $D_p$, the result is of a positive value, and when the measured distance $D_0$ is smaller than the preset distance $D_p$, the result is of a negative value. When the result of the subtraction by the second subtrator 48 is of a negative value, the output signals of the divider 50, the multiplier 52 and the third adder 54 are also of negative values. The third encoder 32 which is used for manually setting the error factor $C_2$, i.e. the correction factor $C_f$, is also arranged to produce an output signal indicative of a factor of either a positive or a negative value.

When a negative value is applied via the error-distance selection switch 30 to the display circuit 28, the display circuit 38 displays a sign, such as "−", which indicates that the displayed numerals are of a negative value. Therefore, the vehicle driver easily ascertain whether the error factor displayed at the display circuit 38 is either positive or negative and thus the vehicle driver will know that whether the distance measured $D_0$ along the predetermined course is larger or smaller than the preset distance $D_p$.

The above described operation of the trip meter is made under the assumption that the trip meter is used for displaying a distance travelled by the vehicle. However, the trip meter may be used for indicating a distance remaining to an objective point or a goal if a distance between two points that the vehicle travels is preset in the up-down counter 14. When the vehicle driver wishes to ascertain a distance remaining to an objective point, the vehicle driver presets a distance which may be obtained by a suitable map into the up-down counter 14 by operating the first encoder 12 and the preset switch 16. Before the vehicle driver leaves for the objective point he operates the up-down control switch 18 to put the up-down counter in its down counting function. With this operation, the up-down counter 14 produces an output signal indicative of a distance remaining to the objective point by subtracting a distance travelled from the preset distance.

In case of the above mentioned measurement of the remaining distance, the error detector 20 may be used in the same manner as in the case of the measurement of the travelled distance. When the measure switch 24 is operated twice, two distances $D_1$ and $D_2$ are respectively stored in the first and second memories 40 and 42 of the error detector 20. Since the distances $D_1$ and $D_2$ are remaining distances, the value of the first distance $D_1$ stored in the first memory 40 is greater than that of the second distance $D_2$ stored in the second memory 42. However, the first subtractor 46 responsive to these two distances $D_1$ and $D_2$ is arranged to produce an output signal indicative of the difference $D_0$ therebetween in an absolute value and thus the result of the subtraction is always of a positive value. The following function of the error detector 20 and the correction circuit is the same as that in case of measuring a travelled distance and thus a corrected distance remaining to the objective point is obtained to be displayed by the display circuit 38.

In the above mentioned embodiment of the trip meter, the second encoder 26 is used for presetting a predetermined reference distance $D_p$ into the error detector 20. However, if the correction of the measured distance is always carried out by measuring a predetermined course of a predetermined distance, the predetermined distance may be fixedly preset in the error detector when the trip meter is manufactured. When such a fixed preset distance is used as the reference distance, the second encoder 26 is not required.

Figure 4:
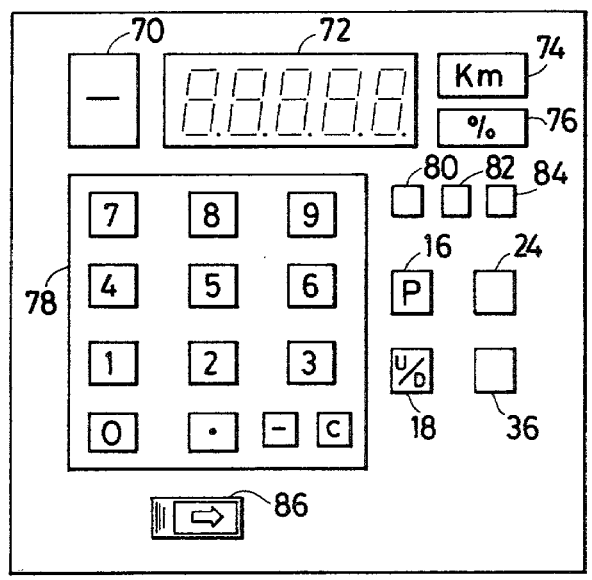
FIG. 4 shows a schematic view of the operation set utilized for the trip meter according to the present invention.

FIG. 4 illustrates a front elevation of an operating set utilized for the trip meter according to the present invention. The operating set consists of a sign display portion 70, a numeral display portion 72, first and second unit display portions 74 and 76, a keyboard 78, first, second and third switches 82, 84 and 86, the error display switch 36, the measure switch 24, and a key lock switch 86.

The sign display portion 70 is arranged to display a sign of "−" to indicate that the displayed numerals, i.e. the error factor $C_1$ or $C_2$, are of a negative value only when the error factor $C_1$ or $C_2$ is of a negative value. The numeral display portion 72 displays either the distance corrected by the correction circuit 22 or the error factor $C_1$ or $C_2$. The first unit display portion 74 displays a unit of distance such as "Km", while the second unit display portion 76 displays a sign of "%". These first and second unit display portions 74 and 76 are selectively energized to display the sign in accordance with the position of the movable contact of the error-distance selection switch 30. With this provision, the sign of Km is displayed at the first unit display portion 74 when the numeral display portion 72 displays the corrected distance, viz. the travelled distance or the remaining distance, while the sign of % is displayed at the second unit display portion 76 when the numeral display portion 72 displays the error factor $C_1$ or $C_2$.

The keyboard 78 includes ten keys corresponding to numerals from 0 to 9, a decimal key ".", a negative sign key "−", and a clear key "C". The keyboard 78 is used for all of the first, second and third encoders 12, 26 and 32 shown in FIG. 1. The first, second and third switches 82, 84 and 86 are used for selectively connecting one encoder to the keyboard 78. When a single encoder is used for the first, second and third encoders 12, 26 and 32 as described hereinbefore, the keyboard 78 is used for the single encoder where the output of the encoder is selectively delivered to the corresponding circuit via the first, second and third switches 82, 84 and 86. The negative sign key "−" is used for manually encoding a negative error factor $C_2$, such as −4%, when the keyboard 78 is used for the third encoder. The clear key "C" is used for cancelling erroneous signals produced by misoperations of the ten keys of the numerals and the decimal key. The preset switch 16, the up-down control switch 18, the error display switch 36 and the measure switch 24 respectively correspond to the switches of the same name shown in FIG. 1. The key lock switch 86 disposed at the lower portion of the front panel of the operation set is utilized for disconnecting the various keys of the panel from the corresponding circuit. Therefore, when the key lock switch 86 is turned on, operations of the keys on the panel do not influence the trip meter at all so that undesirable operations of the trip meter due to a careless touch of the keys is prevented.

The operating set is preferably mounted on the instrument panel of the vehicle so that the vehicle driver can readily operate the keys and see the display portions 70, 72, 74 and 76. The preferred embodiment of the trip meter is constructed by discrete elements as shown in FIG. 1 and described hereinabove. However, if desired, the trip meter according to the present invention may be constructed by a micro computer. It is therefore, further understood by those skilled in the art that the foregoing descriptions are of a preferred embodiment of the disclosed trip meter and that various changes and modifications may be made in the invention without departing from the spirit and scope thereof.

What is claimed is:

1. An electronic trip meter with a correction circuit for an automotive vehicle, comprising:
    (a) first means for producing a signal indicative of a function of a distance travelled by the vehicle;
    (b) second means coupled to said first means for producing a signal indicative of an error factor of said function, said second means including means for storing first and second distances both represented by said signal produced by said first means, said first distance indicating a starting point of a predetermined distance and said second distance indicating an end point of said predetermined distance, means for producing a difference between said first and second distances to obtain a measured distance measured along said predetermined distance, and means for detecting said error factor from said measured distance and said predetermined distance;
    (c) third means coupled to said first and second means for correcting said function by said error factor; and
    (d) fourth means coupled to said third means for displaying an information in response to an output from said third means.

2. An electronic trip meter as claimed in claim 1, wherein said second means includes manually operable means coupled to said third means for setting said error factor.

3. An electronic trip meter as claimed in claim 2, wherein said third means is supplied with said error factor selectively from said error factor detecting means or from said manually operable means under the control of a first switch.

4. An electronic trip meter as claimed in claim 1, wherein said error factor detecting means comprises means for producing a signal indicative of a difference between said measured distance and said predetermined distance, means for dividing said difference between said measured distance and said predetermined distance by said predetermined distance, and means for multiplying an output from said dividing means by 100 to obtain said error factor.

5. An electronic trip meter as claimed in claim 4, wherein said second means includes means coupled to said multiplying means of said error factor detecting means for storing said error factor.

6. An electronic trip meter as claimed in claim 4 or 3, wherein said third means comprises means for multiplying said signal of said function of the distance travelled by the vehicle and produced by said first means by 100 to produce a product signal, means for adding 100 to said error factor produced by said second means to produce a sum signal, and means for dividing said product signal by said sum signal to produce said output indicative of said function having been corrected by said error factor.

7. An electronic trip meter as claimed in claim 6, wherein said second means further comprises means for presetting said predetermined distance which is variable.

8. An electronic trip meter as claimed in claim 6, wherein said second means further comprises means for providing said predetermined distance which is fixed.

9. An electronic trip meter as claimed in claim 1, further comprising means for selectively supplying to said fourth means one of said output produced by said third means and said error factor produced by said second means.

10. An electronic trip meter as claimed in claim 9, further comprising timer means for controlling said selectively supplying means, said selectively supplying means permitting the transmission of said error factor to said fourth means for a predetermined period of time defined by an output signal of said timer means.

11. An electronic trip meter as claimed in claim 9, wherein said fourth means displays a sign for indicating that the displayed error factor is of either a positive or a negative value.

12. An electronic trip meter as claimed in claim 1, wherein said first means comprises a travelled distance sensor for producing a pulse each time the vehicle travels a predetermined distance, an up-down counter responsive to the pulse signal, means for presetting a distance into said up-down counter, and means for controlling the up count and the down count, function of said up-down counter, said up-down counter producing a signal indicative of a distance actually travelled by said vehicle when functioning as an up counter, and producing an output signal indicative of a distance remaining to an objective point when functioning as a down counter.

* * * * *